(12) United States Patent
Nomura et al.

(10) Patent No.: US 9,473,734 B2
(45) Date of Patent: *Oct. 18, 2016

(54) INTER-VIDEO CORRESPONDING RELATIONSHIP DISPLAY SYSTEM AND INTER-VIDEO CORRESPONDING RELATIONSHIP DISPLAY METHOD

(75) Inventors: Toshiyuki Nomura, Tokyo (JP); Takami Sato, Tokyo (JP); Kota Iwamoto, Tokyo (JP); Ryota Mase, Tokyo (JP); Naotake Fujita, Tokyo (JP); Kouichi Ueda, Tokyo (JP); Takato Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 13/983,957

(22) PCT Filed: Nov. 28, 2011

(86) PCT No.: PCT/JP2011/077379
§ 371 (c)(1),
(2), (4) Date: Aug. 6, 2013

(87) PCT Pub. No.: WO2012/108090
PCT Pub. Date: Aug. 16, 2012

(65) Prior Publication Data
US 2013/0314601 A1    Nov. 28, 2013

(30) Foreign Application Priority Data
Feb. 10, 2011   (JP) .................................. 2011-027192

(51) Int. Cl.
*G06F 17/30* (2006.01)
*H04N 5/91* (2006.01)
(Continued)

(52) U.S. Cl.
CPC .................. *H04N 5/91* (2013.01); *G11B 27/34* (2013.01); *H04N 9/8205* (2013.01)

(58) Field of Classification Search
CPC .................. G06F 17/30017; G06F 17/30781; H04N 2005/91357; H04N 21/816; H04N 21/8166

USPC .......... 707/794, 792, 758, 805, 634; 386/66, 386/280, 290, 279, 223; 382/305, 218; 348/645, 43; 725/9
See application file for complete search history.

(56) References Cited

U.S. PATENT DOCUMENTS 5,388,197 A * 2/1995 Rayner .................. G11B 27/34
345/660
5,537,530 A * 7/1996 Edgar ............... G06F 17/30843
375/E7.183

(Continued)

FOREIGN PATENT DOCUMENTS

JP    10-149673 A    6/1998
JP    10-224665 A    8/1998

(Continued)

OTHER PUBLICATIONS

Eiji Kasutani, et al., "Video Material Archive System for Efficient Video Editing based on MPEG-7", IPSJ SIG Notes 2003-AVM-40, Mar. 7, 2003, pp. 49-54, vol. 2003, No. 24.

*Primary Examiner* — Frantz Coby
(74) *Attorney, Agent, or Firm* — Sughrue Mion, PLLC (57) ABSTRACT

To enable a presence/absence of a modification of a source video to be readily assessed in a derived video created by utilizing the source video. Relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists is stored in a relationship information storing unit, and based on the relationship information stored in the relationship information storing unit, the segment corresponding relationship between the derived video and the at least one source video is displayed in a display mode in accordance with the presence/absence of a modification of the source video in the segment of the derived video in which the corresponding relationship exists.

9 Claims, 10 Drawing Sheets

RELATIONSHIP INFORMATION STORING UNIT 26

| SOURCE VIDEO | | | DERIVED VIDEO | | | DEGREE OF MODIFICATION |
|---|---|---|---|---|---|---|
| VIDEO TYPE | VIDEO IDENTIFIER | SEGMENT INFORMATION | VIDEO TYPE | VIDEO IDENTIFIER | SEGMENT INFORMATION | |
| BROADCAST | B1 | 00:00~15:00 | EDITED | E1 | 15:00~30:00 | 5 |
| BROADCAST | B1 | 15:00~20:00 | EDITED | E2 | 05:00~10:00 | 1 |
| BROADCAST | B1 | 20:00~30:00 | EDITED | E3 | 03:00~13:00 | 3 |
| ⋮ | ⋮ | ⋮ | ⋮ | ⋮ | ⋮ | ⋮ |
| EDITED | E1 | 00:00~40:00 | COVERAGE | C1 | 10:00~50:00 | 0 |
| EDITED | E2 | 00:00~15:00 | COVERAGE | C2 | 02:00~17:00 | 0 |
| EDITED | E3 | 00:00~30:00 | COVERAGE | C2 | 25:00~55:00 | 0 |
| ⋮ | ⋮ | ⋮ | ⋮ | ⋮ | ⋮ | ⋮ |

(51) Int. Cl.
*G11B 27/34* (2006.01)
*H04N 9/82* (2006.01)

(56) References Cited

U.S. PATENT DOCUMENTS

| | | | | |
|---|---|---|---|---|
| 5,600,375 | A * | 2/1997 | Wickstrom | H04N 19/107 348/400.1 |
| 5,647,047 | A * | 7/1997 | Nagasawa | 386/279 |
| 6,646,674 | B1 * | 11/2003 | Kato | H04L 29/06027 348/14.01 |
| 6,970,639 | B1 * | 11/2005 | McGrath et al. | 386/290 |
| 7,624,337 | B2 * | 11/2009 | Sull et al. | 715/201 |
| 7,925,669 | B2 * | 4/2011 | Freeborg et al. | 707/792 |
| 7,929,828 | B1 * | 4/2011 | Xie et al. | 386/280 |
| 8,135,750 | B2 * | 3/2012 | Shur et al. | 707/794 |
| 8,479,081 | B2 * | 7/2013 | Sugaya | 714/776 |
| 8,606,073 | B2 * | 12/2013 | Woodman | 386/223 |
| 8,798,400 | B2 * | 8/2014 | Hill et al. | 382/305 |
| 8,798,402 | B2 * | 8/2014 | Hill et al. | 382/305 |
| 2005/0226598 | A1 * | 10/2005 | Kasutani | G11B 27/034 386/219 |
| 2006/0015890 | A1 * | 1/2006 | Kasutani | G11B 27/031 725/9 |
| 2007/0038612 | A1 * | 2/2007 | Sull et al. | 707/3 |
| 2008/0037040 | A1 * | 2/2008 | Hashimoto | H04N 1/00411 358/1.6 |
| 2009/0087160 | A1 * | 4/2009 | Lui et al. | 386/66 |
| 2010/0045594 | A1 * | 2/2010 | Jenks et al. | 345/156 |
| 2010/0162286 | A1 * | 6/2010 | Berry | H04H 60/33 725/14 |
| 2011/0216162 | A1 * | 9/2011 | Filippini et al. | 348/43 |
| 2012/0002884 | A1 * | 1/2012 | Ren et al. | 382/218 |
| 2012/0057078 | A1 * | 3/2012 | Fincham | 348/645 |
| 2013/0031479 | A1 * | 1/2013 | Flowers | 715/716 |
| 2013/0198215 | A1 * | 8/2013 | Lee et al. | 707/758 |

FOREIGN PATENT DOCUMENTS

| | | |
|---|---|---|
| JP | 11-266422 A | 9/1999 |
| JP | 2004-172787 A | 6/2004 |
| JP | 2004-172788 A | 6/2004 |
| JP | 2005-148801 A | 6/2005 |
| JP | 2005-203881 A | 7/2005 |
| JP | 2007-164633 A | 6/2007 |
| JP | 2010-282376 A | 12/2010 |
| WO | 2010/073695 A1 | 7/2010 |
| WO | 2010/084714 A1 | 7/2010 |

* cited by examiner

BROADCAST VIDEO DATABASE

| VIDEO IDENTIFIER | ATTRIBUTE INFORMATION ||| | VIDEO DATA |
| --- | --- | --- | --- | --- |
| | TITLE | CREATION DATE/TIME | DURATION | ... | |
| B1 | ATTRIBUTE B1 ||| | VIDEO DATA B1 |
| B2 | ATTRIBUTE B2 ||| | VIDEO DATA B2 |
| B3 | ATTRIBUTE B3 ||| | VIDEO DATA B3 |
| ⋮ | ⋮ ||| | ⋮ |

FIG. 4

REGION SPLITTING

| 0 | 1 | 2 | 3 | 4 | 5 | 6 | 7 | 8 | 9 | 10 | 11 | 12 | 13 | ... | 31 |
| --- | --- | --- | --- | --- | --- | --- | --- | --- | --- | --- | --- | --- | --- | --- | --- |
| 32 | ... | ... | ... | ... | ... | ... | ... | ... | ... | ... | ... | ... | ... | ... | ... |
| 64 | ... | ... | ... | ... | ... | ... | ... | ... | ... | ... | ... | ... | ... | ... | ... |
| 96 | ... | ... | ... | ... | ... | ... | ... | ... | ... | ... | ... | ... | ... | ... | ... |
| 128 | ... | ... | ... | ... | ... | ... | ... | ... | ... | ... | ... | ... | ... | ... | ... |
| 160 | ... | ... | ... | ... | ... | ... | ... | ... | ... | ... | ... | ... | ... | ... | ... |
| 192 | ... | ... | ... | ... | ... | ... | ... | ... | ... | ... | ... | ... | ... | ... | ... |
| 224 | ... | ... | ... | ... | ... | ... | ... | ... | ... | ... | ... | ... | ... | ... | ... |
| 256 | ... | ... | ... | ... | ... | ... | ... | ... | ... | ... | ... | ... | ... | ... | ... |
| 288 | ... | ... | ... | ... | ... | ... | ... | ... | ... | ... | ... | ... | ... | ... | ... |
| 320 | ... | ... | ... | ... | ... | ... | ... | ... | ... | ... | ... | ... | ... | ... | ... |
| 352 | ... | ... | ... | ... | ... | ... | ... | ... | ... | ... | ... | ... | ... | ... | ... |
| 384 | ... | ... | ... | ... | ... | ... | ... | ... | ... | ... | ... | ... | ... | ... | ... |
| 415 | ... | ... | ... | ... | ... | ... | ... | ... | ... | ... | ... | ... | ... | ... | ... |
| ⋮ | ... | ... | ... | ... | ... | ... | ... | ... | ... | ... | ... | ... | ... | ... | ... |
| 992 | 993 | 994 | 995 | 996 | 997 | 998 | 999 | 1000 | 1001 | 1002 | 1003 | 1004 | 1005 | ... | 1023 |

COVERAGE VIDEO FEATURE AMOUNT STORING UNIT 30

| VIDEO IDENTIFIER | SEQUENCE INFORMATION | FEATURE AMOUNT VECTOR |
|---|---|---|
| 1 | 1 | (−1, +1, +1, 0, ⋯) |
| | 2 | (0, −1, 0, +1, ⋯) |
| | 3 | (0, +1, +1, 0, ⋯) |
| | 4 | (+1, 0, 0, +1, ⋯) |
| | ⋮ | ⋮ |
| 2 | 1 | (0, +1, 0, −1, ⋯) |
| | 2 | (+1, 0, 0, −1, ⋯) |
| | 3 | (0, −1, −1, 0, ⋯) |
| | 4 | (−1, −1, 0, +1, ⋯) |
| | ⋮ | ⋮ |
| ⋮ | ⋮ | ⋮ |

| RELATIONSHIP INFORMATION STORING UNIT | | | | | | |
|---|---|---|---|---|---|---|
| SOURCE VIDEO | | | DERIVED VIDEO | | | DEGREE OF MODIFICATION |
| VIDEO TYPE | VIDEO IDENTIFIER | SEGMENT INFORMATION | VIDEO TYPE | VIDEO IDENTIFIER | SEGMENT INFORMATION | |
| BROADCAST | B1 | 00:00~15:00 | EDITED | E1 | 15:00~30:00 | 5 |
| BROADCAST | B1 | 15:00~20:00 | EDITED | E2 | 05:00~10:00 | 1 |
| BROADCAST | B1 | 20:00~30:00 | EDITED | E3 | 03:00~13:00 | 3 |
| ... | ... | ... | ... | ... | ... | ... |
| EDITED | E1 | 00:00~40:00 | COVERAGE | C1 | 10:00~50:00 | 0 |
| EDITED | E2 | 00:00~15:00 | COVERAGE | C2 | 02:00~17:00 | 0 |
| EDITED | E3 | 00:00~30:00 | COVERAGE | C2 | 25:00~55:00 | 0 |
| ... | ... | ... | ... | ... | ... | ... |

INTER-VIDEO CORRESPONDING RELATIONSHIP DISPLAY SYSTEM AND INTER-VIDEO CORRESPONDING RELATIONSHIP DISPLAY METHOD

CROSS REFERENCE TO RELATED APPLICATIONS

This application is a National Stage of International Application No. PCT/JP2011/077379 filed Nov. 28, 2011, claiming priority based on Japanese Patent Application No. 2011-027192, filed Feb. 10, 2011, the contents of all of which are incorporated herein by reference in their entirety.

BACKGROUND

The present invention relates to an inter-video corresponding relationship display system and an inter-video corresponding relationship display method.

The proliferation of digital videos has made it easier to use an existing video to create another video. For example, at broadcast stations, a coverage video generated as a result of coverage is edited to create an edited video. A plurality of edited videos is used to create a broadcast video that is actually used when broadcasting a program. In addition, a coverage video is not always used in one edited video and may sometimes be edited in various ways as necessary to create a plurality of edited videos. On a similar note, an edited video is not always used in one broadcast video and may sometimes be used in a plurality of broadcast videos.

As described above, corresponding relationship between videos becomes more difficult to assess as the number of videos increases. In consideration thereof, for example, as disclosed in Patent Document 1, a method is proposed for displaying corresponding relationship between videos by registering corresponding relationship among raw material videos, edited videos, and on-air videos in a database. With this method, when a video is created, a corresponding relationship between the video and other videos are registered in the database. Therefore, with respect to created videos, it is premised that corresponding relationship thereof has been registered in the database.

However, in actual practice, a plurality of videos is often generated without registering a corresponding relationship of created videos in the database. In such a case, first, a corresponding relationship between videos must be detected. For example, Patent Document 2 discloses a method of searching for a content that is similar to a given content by using feature information of the given content. In addition, for example, Patent Document 3 discloses a method of judging an identity of contents based on feature amounts of the contents for the purpose of grouping the contents.

Furthermore, for example, creating a broadcast video from an edited video may sometimes involve a modification such as adding a telop. Therefore, such modifications must be taken into consideration in order to find a video in which a corresponding relationship exists from a large number of created videos. Accordingly, for example, Patent Document 4 discloses a method capable of judging identity between videos with a high discriminatory ability even when such modifications have been made.

Patent Document 1: Patent Publication JP-A-2004-172788

Patent Document 2: Patent Publication JP-A-2005-148801

Patent Document 3: Patent Publication JP-A-2007-164633

Patent Document 4: WO 2010/084714

However, with the method disclosed in Patent Document 1, although a corresponding relationship between videos is displayed, a presence/absence of a modification of a source video in each segment of a derived video cannot be readily assessed when the derived video is created by utilizing a part of segments of the source video. For example, while there may be cases where a broadcast video is created by modifying an edited video such as adding a telop or the like, it is impossible to readily assess which segment of the broadcast video had been modified from the edited video. Therefore, for example, in order to confirm what kind of a modification had been made to an edited video to create a broadcast video, all segments of the broadcast video must be played back while comparing with the edited video. In addition, while Patent Documents 2 to 4 disclose methods of judging a similarity or an identity between videos, no disclosures are made with respect to a method that enables a presence/absence of a modification of a source video to be readily assessed.

SUMMARY

The present invention has been made in consideration of such circumstances, and an object thereof is to enable a presence/absence of a modification of a source video to be readily assessed in each segment of a derived video created by utilizing the source video.

An inter-video corresponding relationship display system according to an aspect of the present invention comprises: a relationship information storing unit configured to store relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists; and a corresponding relationship display unit configured to display the segment corresponding relationship between the derived video and the at least one source video in a display mode in accordance with the presence/absence of a modification of the source video in the segment of the derived video in which the corresponding relationship exists, based on the relationship information stored in the relationship information storing unit.

Moreover, as used in the present invention, the term "unit" not only signifies physical means but also includes cases where functions of the "unit" are realized by software. In addition, functions of one "unit" or device may be realized by two or more physical means or devices, and functions of two or more "units" or devices may be realized by one physical means or device.

According to the present invention, a presence/absence of a modification of a source video can be readily assessed of a derived video created by utilizing the source video.

DETAILED DESCRIPTION

Hereinafter, an embodiment of the present invention will be described with reference to the drawings.

Figure 1:
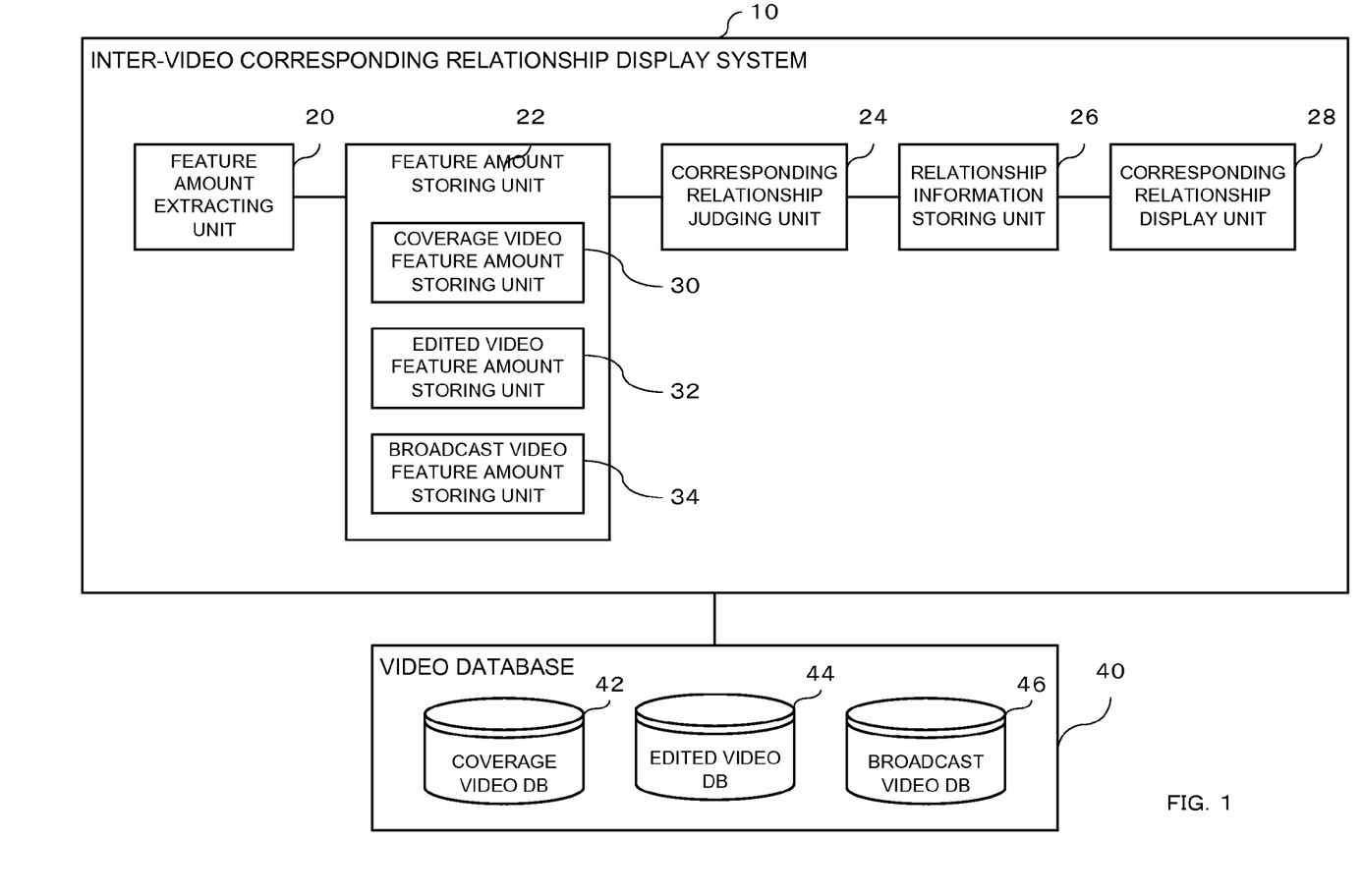
FIG. 1 is a diagram showing a configuration of an inter-video corresponding relationship presentation system that is an embodiment of the present invention.

FIG. 1 is a diagram showing a configuration of an inter-video corresponding relationship presentation system that is an embodiment of the present invention. An inter-video corresponding relationship display system 10 is a system for presenting an inter-video corresponding relationship and a presence/absence of a modification of each segment of a derived video between videos in which a corresponding relationship exists during a creation process, and is configured so as to comprise a feature amount extracting unit 20, a feature amount storing unit 22, a corresponding relationship judging unit 24, a relationship information storing unit 26, and a corresponding relationship display unit 28. As shown in FIG. 1, the feature amount storing unit 22 includes a coverage video feature amount storing unit 30, an edited video feature amount storing unit 32, and a broadcast video feature amount storing unit 34. In addition, the inter-video corresponding relationship display system 10 refers to a video database 40. The video database 40 includes a coverage video database (DB) 42, an edited video database (DB) 44, and a broadcast video database (DB) 46.

The inter-video corresponding relationship display system 10 as described above is configured using one or a plurality of information processing devices, and the feature amount extracting unit 20, the corresponding relationship judging unit 24, and the corresponding relationship display unit 28 can be realized by having a processor execute a program stored in a memory. In addition, the feature amount storing unit 22 and the relationship information storing unit 26 can be realized using a storage area of a memory, a storage device, or the like.

As used herein, "videos in which a corresponding relationship exists during a creation process" refer to, for example, a coverage video used in a broadcast station, an edited video created using at least a part of the coverage video, and a broadcast video created using at least a part of the edited video. In this case, the broadcast video is a derived video, and a coverage or edited video is a source video. Moreover, videos in which a corresponding relationship exists during a creation process are not limited to videos used by a broadcast station. For example, when there is an illegal video created from a broadcast video or a video on a recording medium and which has been posted on a video site, the broadcast video or the video on the recording medium is a source video and the illegal video is a derived video. While the present embodiment will be described with a focus on videos used by a broadcast station, a corresponding relationship display system described in the present embodiment is applicable to any videos as long as a corresponding relationship exists between the videos during a creation process.

Figure 2:
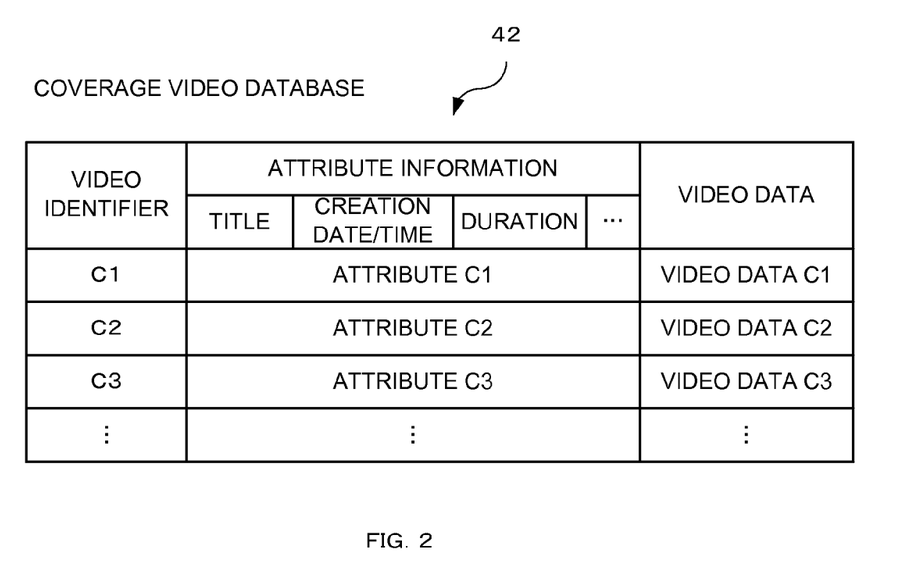
FIG. 2 is a diagram showing a configuration example of a coverage video database.

First, a configuration of the video database 40 will be described with reference to FIGS. 2 to 4. FIG. 2 is a diagram showing a configuration example of the coverage video DB 42. The coverage video DB 42 stores video data of coverage videos in association with video identifiers and attribute information. A video identifier is information for identifying a coverage video and, for example, a file name can be used. Attribute information is information indicating various attributes of a coverage video and includes, for example, a title or a creation date/time of the video and a duration of the entire video.

Figure 3:
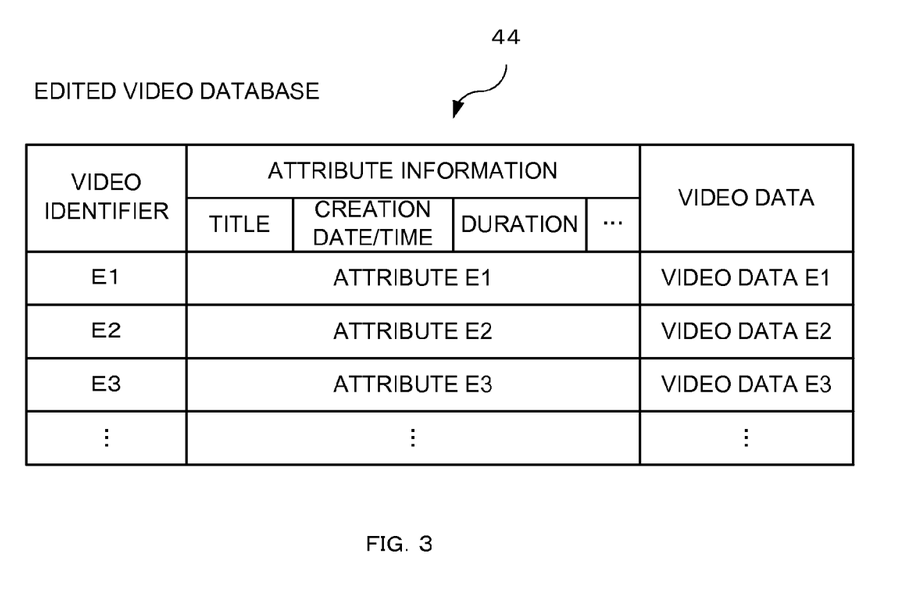
FIG. 3 is a diagram showing a configuration example of an edited video database.

FIG. 3 is a diagram showing a configuration example of the edited video DB 44. The edited video DB 44 stores video data of edited videos in association with video identifiers and attribute information. The video identifiers and the attribute information are similar to those of the coverage video DB 42.

Figure 4:
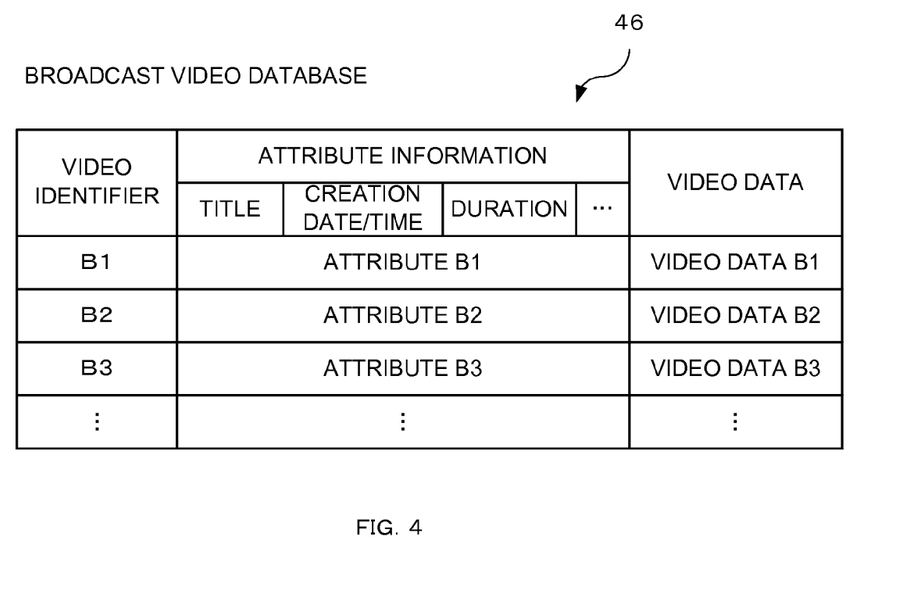
FIG. 4 is a diagram showing a configuration example of a broadcast video database.

FIG. 4 is a diagram showing a configuration example of the broadcast video DB 46. The broadcast video DB 46 stores video data of broadcast videos in association with video identifiers, attribute information, and frequency information. The video identifiers and the attribute information are similar to those of the coverage video DB 42. For frequency information, for example, information is set which indicates the number of times a broadcast video has been broadcasted. For example, a value of the frequency information can be incremented each time a broadcast video is re-aired. Alternatively, a re-aired broadcast video may be stored in the broadcast video DB 46 as a video separate from the original broadcast video. In this case, attribute information can include information regarding a broadcast date/time. In addition, in a case where a broadcast video is distributed on demand from a viewer, the number of times the broadcast video has been viewed may be set as frequency information.

Moreover, while coverage videos, edited videos, and broadcast videos are to be stored in separate databases in the present embodiment, the videos may be arranged so as to be collectively stored in a single database. In this case, for example, information indicating a video type may be assigned to each video.

Returning to FIG. 1, various units which constitute the inter-video corresponding relationship display system 10 will now be described in detail.

The feature amount extracting unit 20 refers to the video database 40 to extract a feature amount vector from each of a plurality of frame images that constitutes a video and stores the feature amount vectors in the feature amount storing unit 22. In the present embodiment, feature amount vectors of coverage videos, edited videos, and broadcast videos are respectively stored in the coverage video feature amount storing unit 30, the edited video feature amount storing unit 32, and the broadcast video feature amount storing unit 34. Alternatively, feature amount vectors of coverage videos, edited videos, and broadcast videos may be arranged so as to be collectively stored in a single storing unit. In this case, information indicating a video type may be assigned to each feature amount vector.

A feature amount vector indicates a feature amount for each predetermined segment that constitutes a video. In the present embodiment, it is assumed that a feature amount vector is generated for each frame image constituting a video according to a method described in WO 2010/084714. A feature amount vector generated according to this method is a set of N-number (where N≥2) of feature amounts corresponding to N-number of subregions defined in a frame image. Each subregion corresponding to each dimension of a feature amount vector includes, for example, a plurality of subregions of a frame image. In addition, a feature amount of each dimension can be generated based on, for example, a difference among feature amounts of a plurality of subregions corresponding to each dimension.

Figure 5:
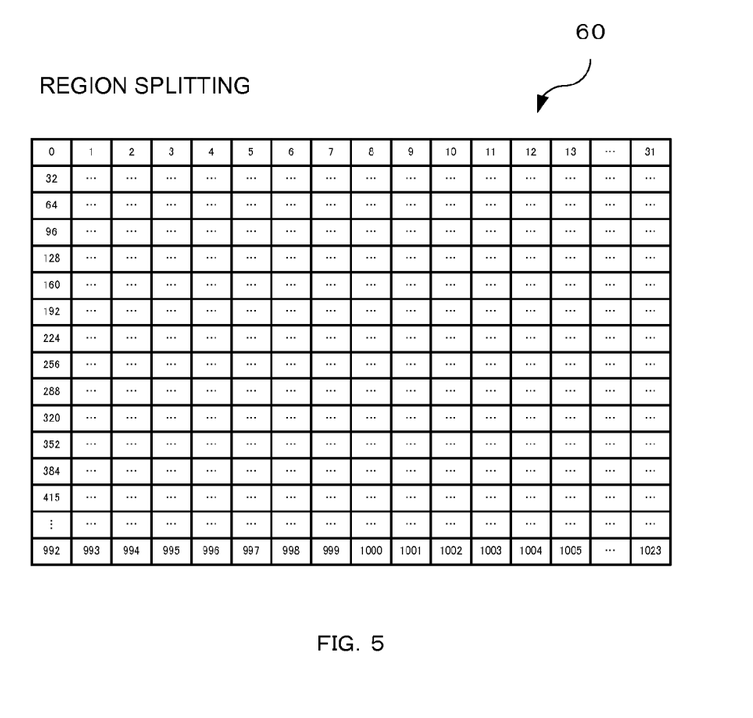
FIG. 5 is a diagram showing an example of region splitting of a frame image.

FIG. 5 is a diagram showing an example of region splitting of a frame image. As shown in FIG. 5, for example, each frame image can be split into 32×32=1024 regions (split regions). A subregion corresponding to each dimension in a feature amount vector is constituted by a combination of one or more split regions.

Figure 6:
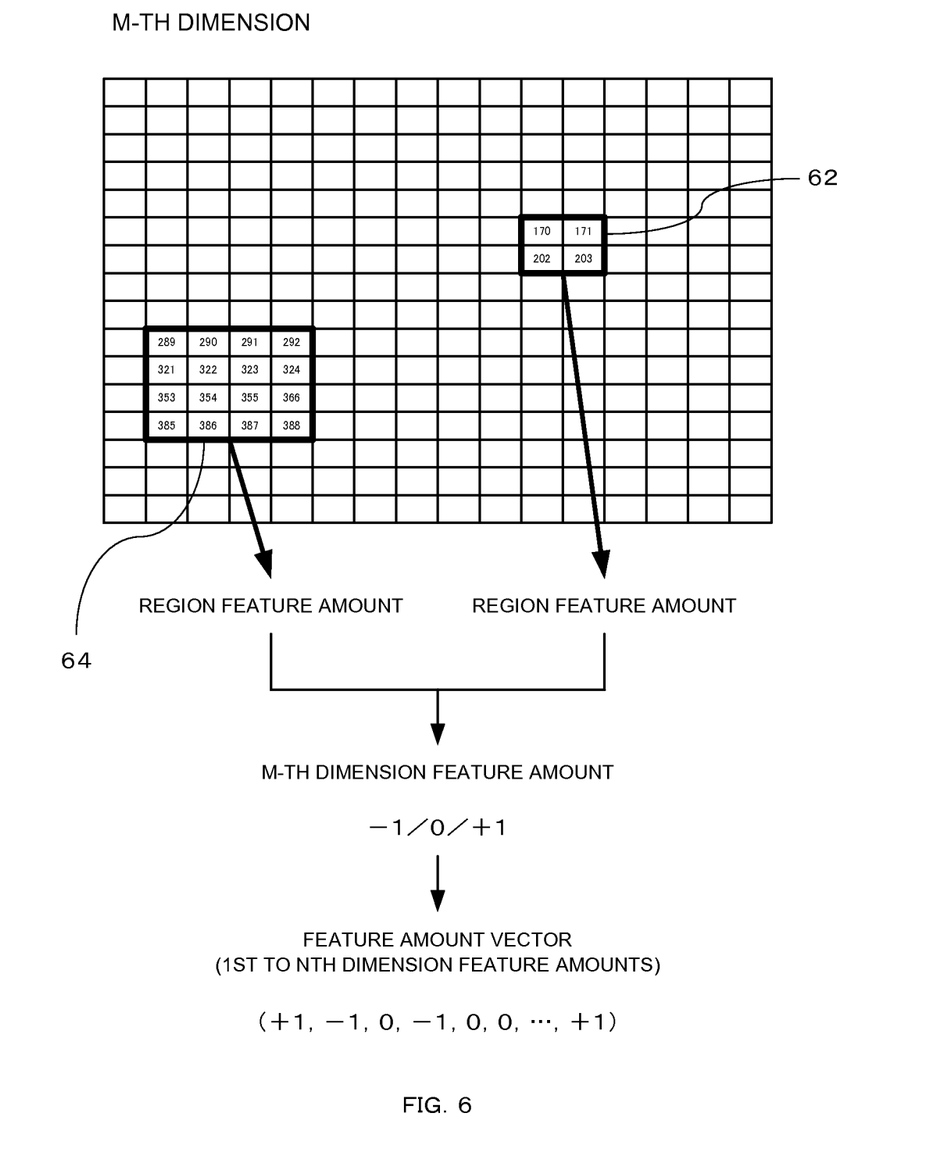
FIG. 6 is a diagram showing an image from which M-th dimension feature amounts are extracted.

FIG. 6 is a diagram showing an image from which M-th dimension feature amounts are extracted. In the example shown in FIG. 6, two subregions 62 and 64 correspond to the M-th dimension. In addition, the feature amount extracting unit 20 is capable of generating an M-th dimension feature amount based on a difference between a feature amount (region feature amount) of the subregion 62 and a feature amount (region feature amount) of the subregion 64. In this case, the feature amounts of the respective subregions 62 and 64 can be calculated by any method such as that based on an average value or a median value of pixel values in the respective subregions. In addition, the feature amount extracting unit 20 can generate an M-th dimension feature amount by quantizing a difference between the region feature amounts of the subregions 62 and 64 into three values (−1, 0, 1). By generating a feature amount for each of the dimensions (first to Nth dimensions), the feature amount extracting unit 20 can generate an Nth dimension feature amount vector. It should be noted that the method of calculating a feature amount of each dimension as described above is merely an example and a feature amount vector can be generated using any method.

Figure 7:
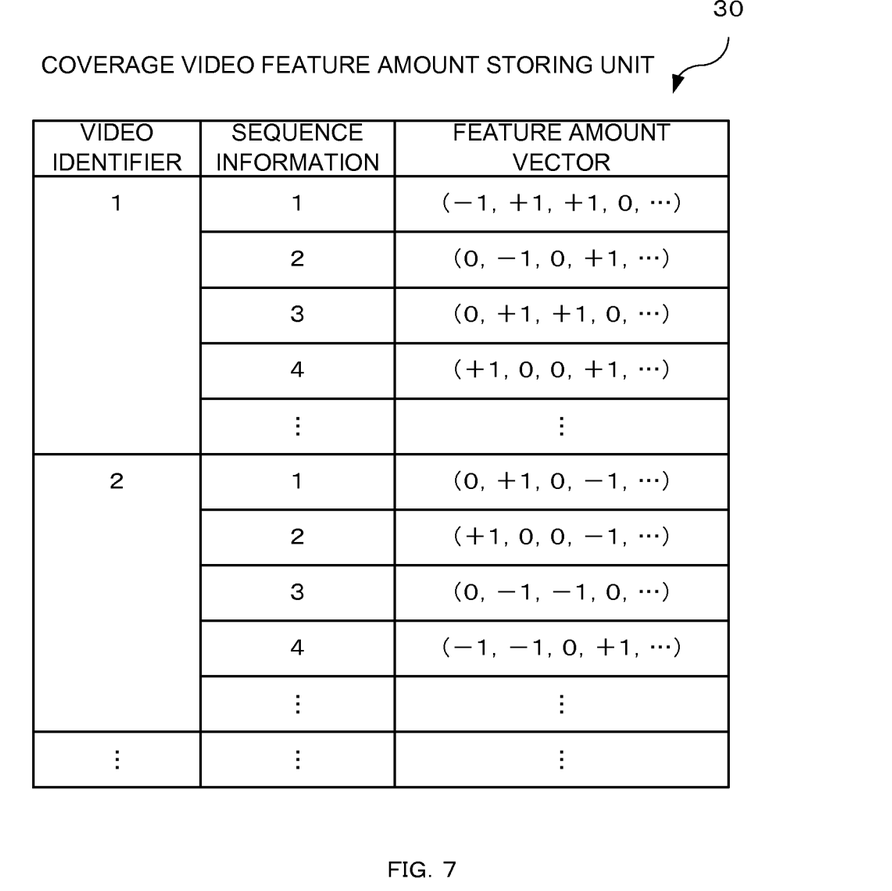
FIG. 7 is a diagram showing an example of feature amount vectors stored in a feature amount storing unit.

FIG. 7 is a diagram showing an example of a feature amount vector stored in the coverage video feature amount storing unit 30. As shown in FIG. 7, a feature amount vector is stored in association with a video identifier and sequence information which indicates a chronological order of a frame image. Sequence information may be any information which enables an order of a feature amount vector to be assessed and, for example, a frame number can be used. Alternatively, if a data storage structure or the like enables a chronological order of a feature amount vector to be identified, sequence information need not necessarily be used. The edited video feature amount storing unit 32 and the broadcast video feature amount storing unit 34 can be configured in a similar manner to the coverage video feature amount storing unit 30.

Returning to FIG. 1, the corresponding relationship judging unit 24 judges a corresponding relationship between videos based on feature amount vectors stored in the feature amount storing unit 22. Specifically, a corresponding relationship between a coverage video (source video) and an edited video (derived video) and a corresponding relationship between the edited video (source video) and a broadcast video (derived video) are judged. Accordingly, a corresponding relationship between the coverage video (source video) and the broadcast video (derived video) can be indirectly judged via the edited video. Moreover, the corresponding relationship judging unit 24 is also capable of directly judging a corresponding relationship between a coverage video and a broadcast video without using an edited video.

Figure 8:
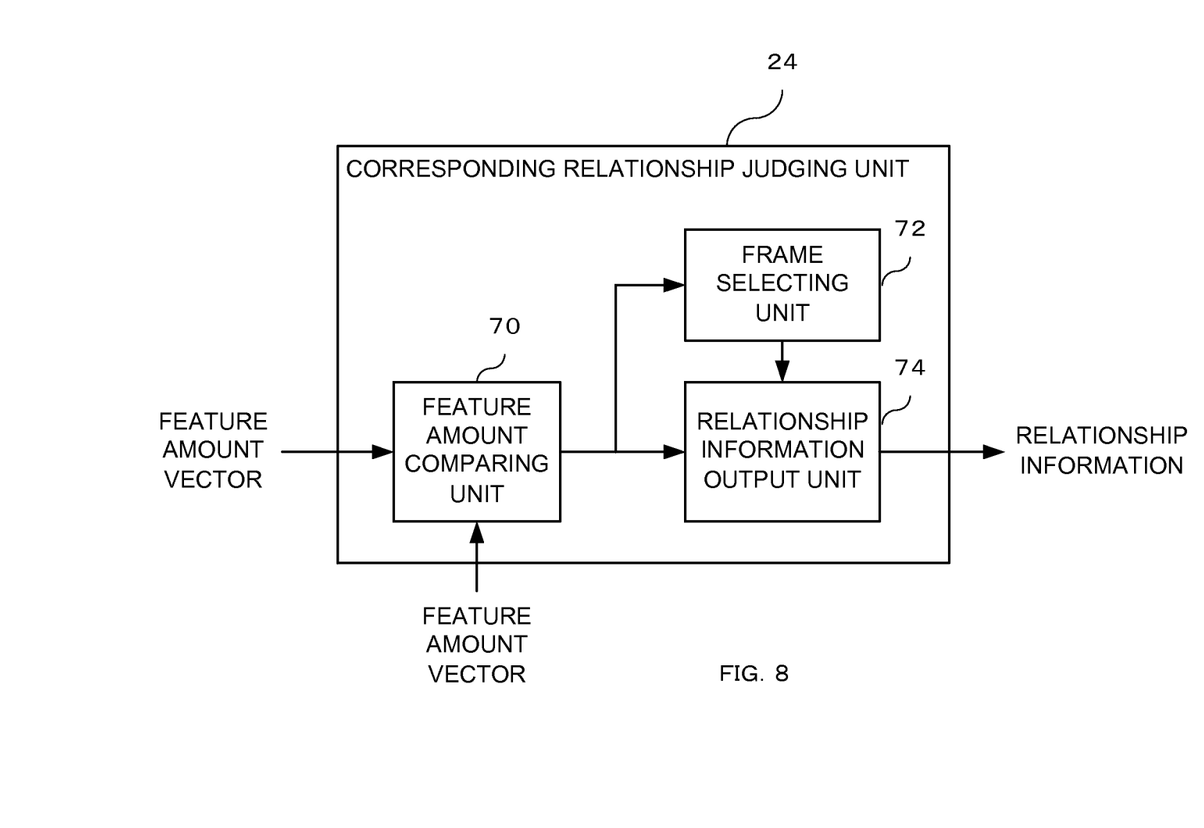
FIG. 8 is a diagram showing a configuration example of a corresponding relationship judging unit.

FIG. 8 is a diagram showing a configuration example of the corresponding relationship judging unit 24. As shown in FIG. 8, the corresponding relationship judging unit 24 can be configured so as to include a feature amount comparing unit 70, a frame selecting unit 72, and a relationship information output unit 74.

The feature amount comparing unit 70 compares a feature amount vector of a video that is a source video candidate with a feature amount vector of a video that is a derived video candidate on, for example, a per-frame basis. For example, the feature amount comparing unit 70 compares a feature amount vector of a coverage video with a feature amount vector of an edited video. In addition, the feature amount comparing unit 70 compares a feature amount vector of an edited video with a feature amount vector of a broadcast video.

The frame selecting unit 72 selects a frame image judged to have corresponding relationship (identity) between videos based on a result of a comparison by the feature amount comparing unit 70. Moreover, a judgment of identity between frame images can be performed by, for example, comparing the number of dimensions with identical feature amounts or comparing the number of dimensions with non-identical feature amounts between two feature amount vectors or by comparing sizes of two feature amount vectors.

The relationship information output unit 74 outputs relationship information that is information indicating a segment in which a corresponding relationship exists between videos. Specifically, the relationship information output unit 74 generates relationship information indicating a segment judged to have identity between frame images by the frame selecting unit 72 and stores the relationship information in the relationship information storing unit 26. In addition, the relationship information output unit 74 outputs information indicating a degree of modification of a segment having a corresponding relationship between videos based on a result of a comparison by the feature amount comparing unit 70. In this case, a degree of modification indicates a degree, in which a modification is performed when creating a derived video using a source video by adding a telop or the like, and, for example, can be obtained by means of the same method as that employed when judging identity between frame images as explained above.

Figure 9:
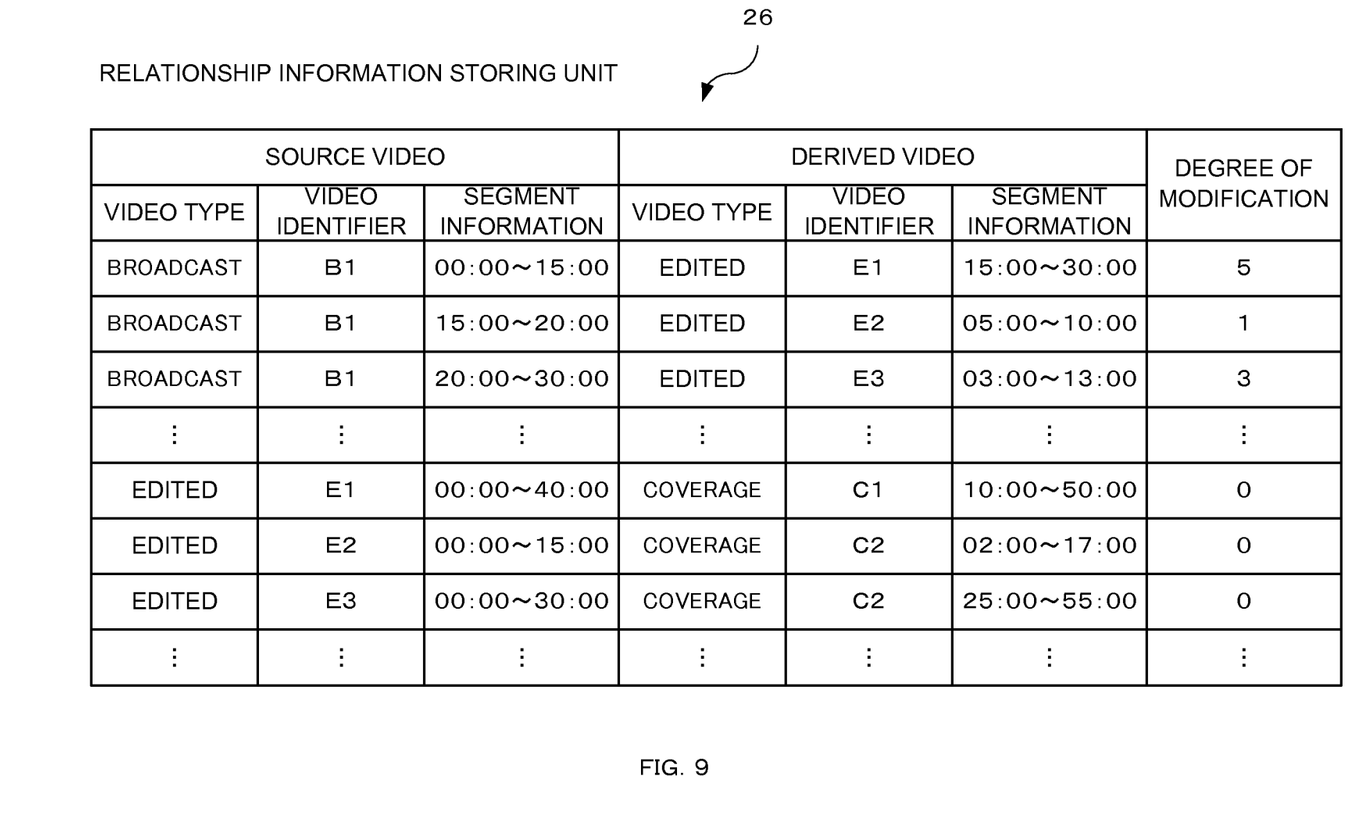
FIG. 9 is a diagram showing an example of relationship information stored in a relationship information storing unit.

FIG. 9 is a diagram showing an example of relationship information stored in the relationship information storing unit 26. As shown in FIG. 9, relationship information includes information related to a source video, information related to a derived video, and information indicating a degree of modification. Information related to a source video or a derived video includes a video type, a video identifier, and segment information. A video type is information indicating any of a coverage video, an edited video, and a broadcast video. Segment information is information indicating a video segment and, for example, a playback time or a frame number of the segment in the video can be used.

FIG. 9 shows that a broadcast video B1 has been created by utilizing the edited videos E1 to E3. More specifically, a segment "15:00 to 30:00" of the edited video E1 is utilized in a segment "00:00 to 15:00" of the broadcast video B1 in a degree of modification of "5". In other words, it is shown that the segment "00:00 to 15:00" of the broadcast video B1 is the segment "15:00 to 30:00" of the edited video E1 with modification. In a similar manner, it is shown that a segment "15:00 to 20:00" of the broadcast video B1 is a segment "05:00 to 10:00" of the edited video E2 with modification and a segment "20:00 to 30:00" of the broadcast video B1 is a segment "03:00 to 13:00" of the edited video E3 with modification. Moreover, while only one value is shown in FIG. 9 as a degree of modification in a segment in which a corresponding relationship exists, when the degree of modification varies within a segment, a degree of modification may be set for each of a plurality of segments (split segments) included in the segment.

In addition, in FIG. 9, a segment "00:00 to 40:00" of the edited video E1 has been created from a segment "10:00 to 50:00" of the coverage video C1 in a degree of modification of "0". In other words, it is shown that the edited video E1 is the segment "10:00 to 50:00" of the coverage video C1 extracted without modification. In a similar manner, it is shown that the edited videos E2 and E3 are, respectively, the segments "02:00 to 17:00" and "25:00 to 55:00" of the coverage video C2 extracted without modification.

Returning to FIG. 1, the corresponding relationship display unit 28 displays a corresponding relationship between the derived video and the source video in a display mode in accordance with a degree of modification in each segment of the derived video based on the relationship information stored in the relationship information storing unit 26.

Figure 10:
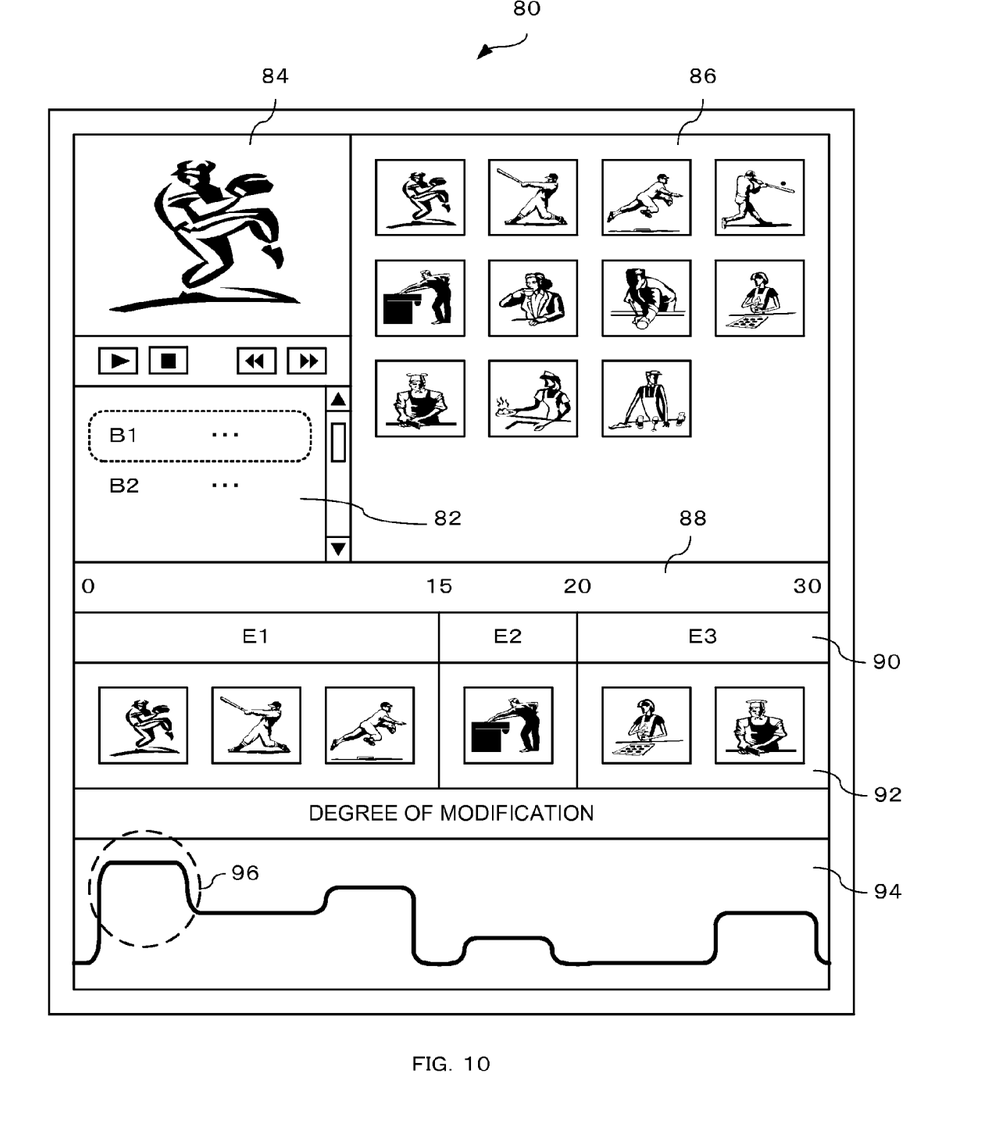
FIG. 10 is a diagram showing an example of a screen outputted by a corresponding relationship display unit.

FIG. 10 is a diagram showing an example of a screen outputted by the corresponding relationship display unit 28. The corresponding relationship display unit 28 is capable of displaying a corresponding relationship between videos based on relationship information stored in the relationship information storing unit 26. As shown in FIG. 10, a screen 80 includes regions 82 to 94.

The region 82 displays information for selecting a broadcast video that is a derived video. By referring to the broadcast video DB 46, the corresponding relationship display unit 28 is capable of displaying information such as a video identifier, a title, and a creation date/time of a broadcast video in the region 82. Moreover, in the region 82, the corresponding relationship display unit 28 may display any of information related to all broadcast videos stored in the broadcast video DB 46, information related to only broadcast videos with relationship information thereof stored in the relationship information storing unit 26, or information related to only broadcast videos for which modifications have been made. The region 82 is configured so that a single broadcast video can be selected by a user operation such as a click. The corresponding relationship display unit 28 can display information related to the broadcast video selected in the region 82 in another region.

The region 84 displays representative thumbnail images of the selected broadcast video. In addition, the region 86 displays a plurality of thumbnail images of broadcast videos. Moreover, the corresponding relationship display unit 28 can display thumbnail images of a broadcast video by, for example, referring to the broadcast video DB 46.

The region 88 displays a timeline of a broadcast video, and the region 90 displays a segment corresponding relationship between the broadcast video and an edited video in accordance with a time axis of the timeline of the broadcast video. For example, in the example shown in FIG. 10, a timeline (00:00 to 30:00) of the broadcast video B1 is displayed in the region 88, and the region 90 shows that the segment "00:00 to 15:00" of the broadcast video B1 has been created from the edited video E1, the segment "15:00 to 20:00" of the broadcast video B1 has been created from the edited video E2, and the segment "20:00 to 30:00" of the broadcast video B1 has been created from the edited video E3. Alternatively, when displaying a corresponding relationship between a broadcast video and an edited video in the region 90, the corresponding relationship display unit 28 can display segments of each edited video based on relationship information. For example, the corresponding relationship display unit 28 can display that a segment of the edited video E1 is "15:00 to 30:00". The same applies to the edited videos E2 and E3.

In addition, the region 92 displays thumbnail images of an edited video in a segment in which a corresponding relationship exists with a broadcast video. Moreover, the corresponding relationship display unit 28 can display thumbnail images of an edited video by, for example, referring to the edited video DB 44. In addition, the corresponding relationship display unit 28 is capable of assessing a corresponding relationship between an edited video and a coverage video based on relationship information stored in the relationship information storing unit 26. Therefore, the corresponding relationship display unit 28 can also display in the region 92 thumbnail images of a coverage video corresponding to an edited video by referring to the coverage video DB 42.

Furthermore, the region 94 displays information indicating a degree of modification in a segment in which a corresponding relationship exists as a part of information indicating a segment corresponding relationship between a broadcast video and an edited video. In the example shown in FIG. 10, the degrees of modification of an edited video in the respective segments of a broadcast video are indicated as a graph in accordance with a timeline of the broadcast video. The graph shows that, for example, a degree of modification of a range enclosed by a circle 96 is high. In addition, referring to the timeline of the broadcast video, it is found that a degree of modification in a vicinity of the segment "00:00 to 05:00" of the broadcast video is high. Furthermore, scenes represented by segments with high degrees of modification can be assessed by referring to the thumbnail images in the region 92.

As described above, by displaying a corresponding relationship in the region 90 and displaying a degree of modification in the region 94, the corresponding relationship display unit 28 displays a segment corresponding relationship between a broadcast video and an edited video in a display mode in accordance with the degree of modification in a segment in which a corresponding relationship exists using all of the regions. Moreover, a display mode in accordance with a degree of modification is not limited to a display mode in which a degree of modification is displayed as a graph as shown in FIG. 10 and any display mode may be adopted as long as a degree of modification or a presence/absence of a modification can be identified. For example, a modified segment may be highlighted in the region 90 or the region 92. In addition, for example, intensity or a color of highlighting or a size of a thumbnail image may be varied in accordance with the degree of modification in the region 90 or the region 92.

Figure 11:
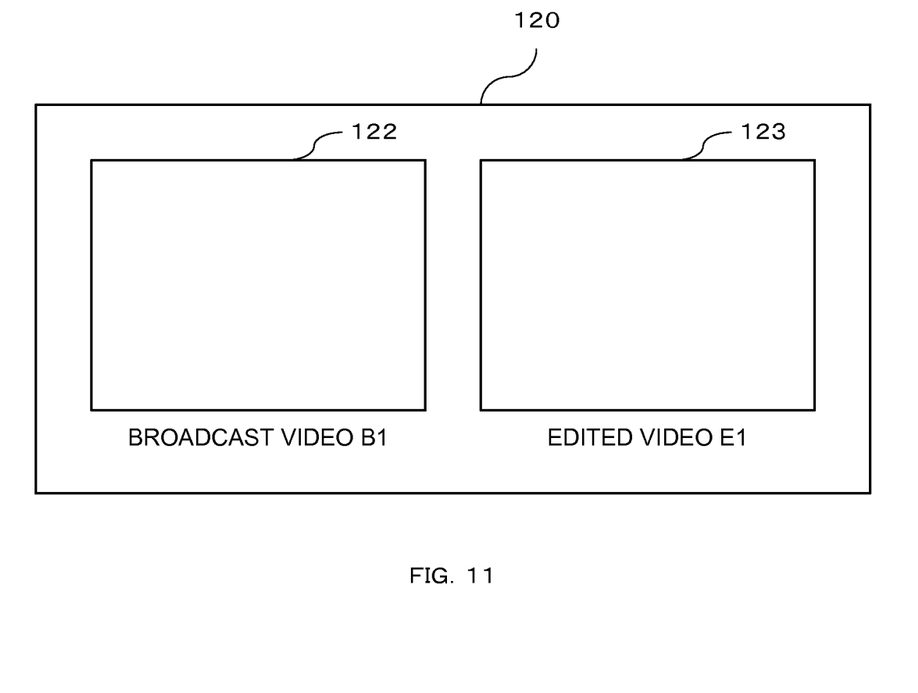
FIG. 11 is a diagram showing an example of a screen displaying a derived video and a source.

Furthermore, when a segment of a video is selected in the region 92, the corresponding relationship display unit 28 can output a screen displaying a broadcast video and an edited video of the selected segment. An example is shown in FIG. 11. A screen 120 includes a region 122 in which a broadcast video is displayed and a region 123 in which an edited video or a coverage video is displayed. The corresponding relationship display unit 28 acquires segment information of the selected segment from relationship information, and acquires a video of the segment from the video database 40 and displays the same in the regions 122 and 123. Alternatively, the corresponding relationship display unit 28 may be configured so as to display a video of a selected segment in the region 86 or the region 94 instead of in the region 92.

Figure 12:
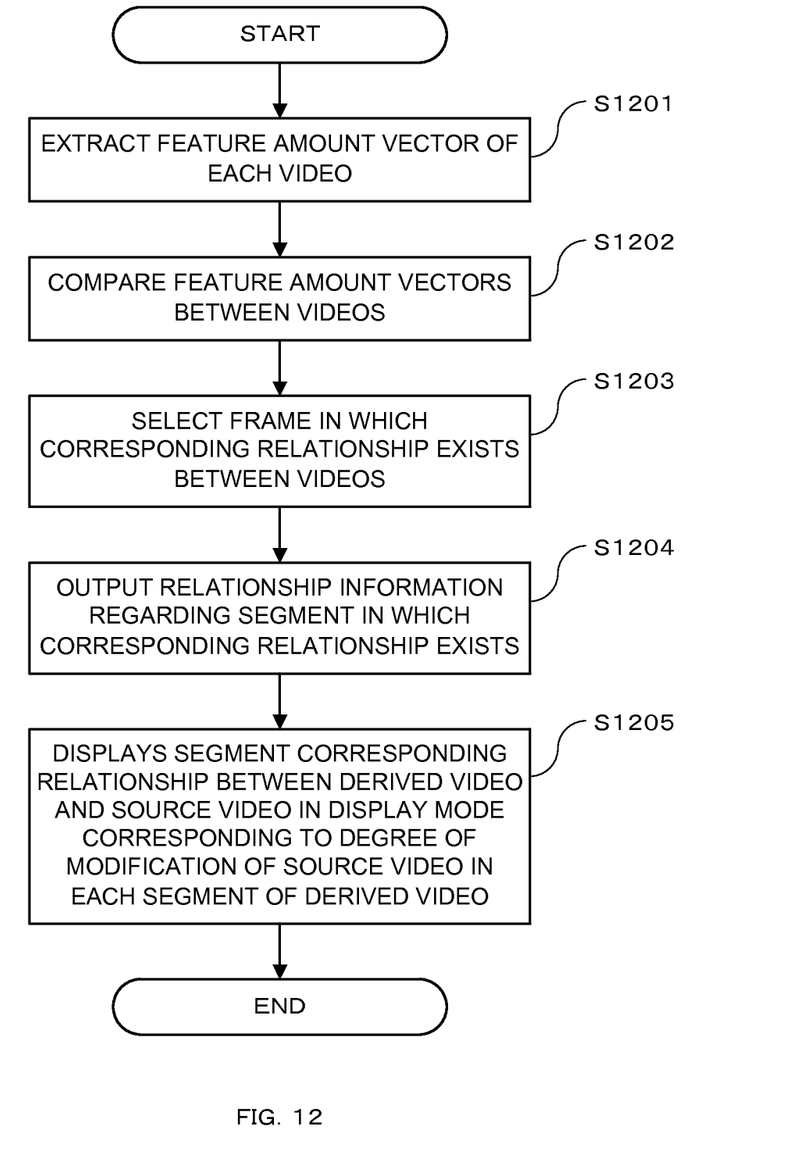
FIG. 12 is a flow chart showing an example of processing in an inter-video corresponding relationship presentation system.

FIG. 12 is a flow chart showing an example of processing by the inter-video corresponding relationship display system 10. First, the feature amount extracting unit 20 extracts a feature amount vector for each video stored in the video database 40 and stores the feature amount vectors in the feature amount storing unit 22 (S1201).

The feature amount comparing unit 70 refers to the feature amount storing unit 22 and compares feature amount vectors between videos (S1202). The frame selecting unit 72 selects a frame image in which a corresponding relationship (identity) exists based on a result of the comparison by the feature amount comparing unit 70 (S1203). In addition, the relationship information output unit 74 stores relationship information regarding segments including the selected frame image in the relationship information storing unit 26 (S1204).

Finally, the corresponding relationship display unit 28 displays a segment corresponding relationship between a derived video (broadcast video) and a source video (edited video or a coverage video) in a display mode corresponding to a degree of modification of the source video in each segment of the derived video based on the relationship information stored in the relationship information storing unit 26 (S1205).

This concludes the description of the present embodiment. With the inter-video corresponding relationship display system 10 according to the present embodiment, since a segment corresponding relationship between a derived video and a source video is displayed in a display mode corresponding to a degree of modification of the source video in each segment of the derived video, a presence/absence of a modification in each segment of the derived video can be readily assessed.

It should be noted that the present embodiment is for facilitating understanding of the present invention and is not for limiting the interpretation of the present invention. Various modifications and changes may be made to the present invention without departing from the spirit and scope thereof, and equivalents are to be included in the present invention.

The present application claims priority on the basis of Japanese Patent Application No. 2011-027192 filed on Feb. 10, 2011, the entire contents of which are incorporated herein by reference.

While the present invention has been described with reference to an embodiment, the present invention is not limited to the embodiment described above. Various modifications to configurations and details of the present invention will occur to those skilled in the art without departing from the scope of the present invention.

A part of or all of the present embodiment may also be described as, but not limited to, the appendices provided below.

(Appendix 1) An inter-video corresponding relationship display system, comprising: a relationship information storing unit configured to store relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists; and a corresponding relationship display unit configured to display the segment corresponding relationship between the derived video and the at least one source video in a display mode in accordance with the presence/absence of a modification of the source video in the segment of the derived video in which the corresponding relationship exists, based on the relationship information stored in the relationship information storing unit.

(Appendix 2) The inter-video corresponding relationship display system according to Appendix 1, wherein the information indicating a presence/absence of a modification in a segment in which the corresponding relationship exists includes information indicating a presence/absence of a modification in each of a plurality of split segments included in the segment, and the corresponding relationship display unit is configured to display the segment corresponding relationship in a display mode in accordance with the presence/absence of a modification in each of the plurality of split segments included in the segment based on the relationship information.

(Appendix 3) The inter-video corresponding relationship display system according to Appendix 1 or 2, wherein the corresponding relationship display unit is configured to display the presence/absence of a modification in accordance with a time axis of the derived video.

(Appendix 4) The inter-video corresponding relationship display system according to any one of Appendices 1 to 3, wherein the corresponding relationship display unit is configured to display the corresponding relationship in accordance with a time axis of the derived video for the at least one source video.

(Appendix 5) The inter-video corresponding relationship display system according to any one of Appendices 1 to 4, wherein the information indicating a presence/absence of a modification in the segment includes information indicating a degree of modification in the segment, and wherein the corresponding relationship display unit is configured to display the segment corresponding relationship in a display mode in accordance with a degree of modification in each segment based on the relationship information.

(Appendix 6) The inter-video corresponding relationship display system according to any one of Appendices 1 to 5, wherein the corresponding relationship display unit is configured to refer to a storing unit in which a thumbnail image of each segment of the source video is stored, display the corresponding relationship in a display mode in accordance with the presence/absence of a modification and, at the same time, display a thumbnail image of the source video in a segment in which the corresponding relationship exists.

(Appendix 7) The inter-video corresponding relationship display system according to any one of Appendices 1 to 6, wherein the relationship information storing unit is configured to store relationship information regarding a plurality of the derived videos, and wherein the corresponding relationship display unit is configured to display information for selecting one of the plurality of the derived videos, and display the corresponding relationship in a display mode in accordance with the presence/absence of a modification for one derived video selected by a user input operation in response to the display.

(Appendix 8) The inter-video corresponding relationship display system according to any one of Appendices 1 to 7, wherein the corresponding relationship display unit is configured to refer to a storing unit, in which the derived video and the source video are stored, in response to a user input operation for selecting one segment from among segments for which the corresponding relationship is displayed, and display the derived video and the source video in the selected segment.

(Appendix 9) The inter-video corresponding relationship display system according to any one of Appendices 1 to 8, further comprising: a feature amount storing unit configured to store in association with each video a feature amount of each predetermined segment that constitutes a video; a feature amount comparing unit configured to compare feature amounts of the segments corresponding to a plurality of videos including the derived video and a source video; and a relationship information output unit configured to output the relationship information based on a result of the comparison of the feature amounts of the segments and store the relationship information in the relationship information storing unit.

(Appendix 10) An inter-video corresponding relationship display method, comprising the steps of: storing relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists; and displaying the segment corresponding relationship between the derived video and the at least one source video in a display mode in accordance with the presence/absence of a modification of the source video in the segment of the derived video in which the corresponding relationship exists, based on the relationship information stored in the relationship information storing unit.

- 10 inter-video corresponding relationship display system
- 20 feature amount extracting unit
- 22 feature amount storing unit
- 24 corresponding relationship judging unit
- 26 relationship information storing unit
- 28 corresponding relationship display unit
- 30 coverage video feature amount storing unit
- 32 edited video feature amount storing unit
- 34 broadcast video feature amount storing unit
- 40 video database
- 42 coverage video database
- 44 edited video database
- 46 broadcast video database
- 70 feature amount comparing unit
- 72 frame selecting unit
- 74 relationship information output unit

We claim:

1. An inter-video corresponding relationship display system, comprising:

a relationship information storing unit configured to store relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists; and a corresponding relationship display unit configured to display the segment corresponding relationship between the derived video and the at least one source video in a display mode in accordance with the presence/absence of a modification of the source video in the segment of the derived video in which the corresponding relationship exists, based on the relationship information stored in the relationship information storing unit, wherein the information indicating a presence/absence of a modification in the segment includes information indicating a degree of modification in the segment, and wherein the corresponding relationship display unit is configured to display the segment corresponding relationship in a display mode in accordance with a degree of modification in each segment based on the relationship information.

2. The inter-video corresponding relationship display system according to claim 1, wherein the information indicating a presence/absence of a modification in a segment in which the corresponding relationship exists includes information indicating a presence/absence of a modification in each of a plurality of split segments included in the segment, and the corresponding relationship display unit is configured to display the segment corresponding relationship in a display mode in accordance with the presence/absence of a modification in each of the plurality of split segments included in the segment based on the relationship information.

3. The inter-video corresponding relationship display system according to claim 1, wherein the corresponding relationship display unit is configured to display the presence/absence of a modification in accordance with a time axis of the derived video.

4. The inter-video corresponding relationship display system according to claim 1, wherein the corresponding relationship display unit is configured to display the corresponding relationship in accordance with a time axis of the derived video for the at least one source video.

5. The inter-video corresponding relationship display system according to claim 1, wherein the corresponding relationship display unit is configured to refer to a storing unit in which a thumbnail image of each segment of the source video is stored, display the corresponding relationship in a display mode in accordance with the presence/absence of a modification and, at the same time, display a thumbnail image of the source video in a segment in which the corresponding relationship exists.

6. The inter-video corresponding relationship display system according to claim 1, wherein the relationship information storing unit is configured to store relationship information regarding a plurality of the derived videos, and wherein the corresponding relationship display unit is configured to display information for selecting one of the plurality of the derived videos, and display the corresponding relationship in a display mode in accordance with the presence/absence of a modification for one derived video selected by a user input operation in response to the display.

7. The inter-video corresponding relationship display system according to claim 1, wherein the corresponding relationship display unit is configured to refer to a storing unit, in which the derived video and the source video are stored, in response to a user input operation for selecting one segment from among segments for which the corresponding relationship is displayed, and display the derived video and the source video in the selected segment.

8. The inter-video corresponding relationship display system according to claim 1, further comprising:
- a feature amount storing unit configured to store in association with each video a feature amount of each predetermined segment that constitutes a video;
- a feature amount comparing unit configured to compare feature amounts of the segments corresponding to a plurality of videos including the derived video and a source video; and
- a relationship information output unit configured to output the relationship information based on a result of the comparison of the feature amounts of the segments and store the relationship information in the relationship information storing unit.

9. An inter-video corresponding relationship display method, comprising the steps of:
- storing relationship information including information indicating a segment corresponding relationship between at least one source video and a derived video created by utilizing at least a part of segments of the at least one source video and information indicating a presence/absence of a modification of the source video in a segment of the derived video in which the corresponding relationship exists; and
- displaying the segment corresponding relationship between the derived video and the at least one source video in a display mode in accordance with the presence/absence of a modification of the source video in the segment of the derived video in which the corresponding relationship exists, based on the relationship information stored in the relationship information storing unit,
- wherein the information indicating a presence/absence of a modification in the segment includes information indicating a degree of modification in the segment, and
- wherein the displaying the segment corresponding relationship comprises displaying the segment corresponding relationship in a display mode in accordance with a degree of modification in each segment based on the relationship information.

* * * * *